United States Patent
Holbrook et al.

(10) Patent No.: US 12,540,466 B2
(45) Date of Patent: Feb. 3, 2026

(54) STORMWATER BOX WITH PYRAMIDAL POLYHEDRON BRACING

(71) Applicant: INFILTRATOR WATER TECHNOLOGIES, LLC, Old Saybrook, CT (US)

(72) Inventors: Paul Holbrook, Old Saybrook, CT (US); Adam Miller, Haddam, CT (US)

(73) Assignee: INFILTRATOR WATER TECHNOLOGIES, LLC, Old Saybrook, CT (US)

( * ) Notice: Subject to any disclaimer, the term of this patent is extended or adjusted under 35 U.S.C. 154(b) by 134 days.

(21) Appl. No.: 18/514,732

(22) Filed: Nov. 20, 2023

(65) Prior Publication Data
US 2024/0084574 A1  Mar. 14, 2024

Related U.S. Application Data (63) Continuation of application No. 17/459,398, filed on Aug. 27, 2021, now Pat. No. 11,851,867.

(51) Int. Cl.
*E03F 1/00* (2006.01)
*E03F 5/10* (2006.01)

(52) U.S. Cl.
CPC .................. *E03F 5/101* (2013.01)

(58) Field of Classification Search
CPC .................. E03F 1/005; E03F 5/101
See application file for complete search history.

(56) References Cited

U.S. PATENT DOCUMENTS

| | | | | |
|---|---|---|---|---|
| 3,069,805 A | * | 12/1962 | Burrows | A63F 7/042 446/124 |
| 3,696,549 A | * | 10/1972 | Zilius | A63F 7/042 446/168 |
| 6,991,402 B2 | | 1/2006 | Burkhart | |
| 2007/0227094 A1 | | 10/2007 | Oscar | |
| 2009/0279953 A1 | * | 11/2009 | Allard | E03F 1/005 405/39 |
| 2014/0291221 A1 | * | 10/2014 | Adams | E03F 3/046 210/170.03 |
| 2015/0016874 A1 | * | 1/2015 | Wandkowski | F16B 5/0004 403/292 |
| 2015/0017384 A1 | | 1/2015 | Wichmann et al. | |
| 2016/0097175 A1 | | 4/2016 | Parker | |
| 2020/0248442 A1 | | 8/2020 | Yuki | |

OTHER PUBLICATIONS

Proto Labs, Inc. "Design Cube", Brochure (2019) 2 pages.

* cited by examiner

*Primary Examiner* — Carib A Oquendo
(74) *Attorney, Agent, or Firm* — FINNEGAN, HENDERSON, FARABOW, GARRETT & DUNNER L.L.P.

(57) ABSTRACT

A rectanguloid shape six-walled thermoplastic box for receiving and dispersing stormwater, when part of an array of like boxes that is buried in media, has interior bracing in the form of an irregular polyhedron structure comprised of up to six hollow pyramids. The truncated apexes of the pyramids meet near the center of the box. The base of each hollow pyramid is contact with, attached to, or integral with a wall at the location of an opening within which is a grate. A box may be injection molded as a single piece molding with living hinges. Alternatively, the pyramidal polyhedron structure may be formed as a separate element and placed within the walls of a box.

20 Claims, 9 Drawing Sheets

STORMWATER BOX WITH PYRAMIDAL POLYHEDRON BRACING

This is a continuation of application Ser. No. 17/459,398, filed Aug. 27, 2021, currently allowed, which is incorporated herein by reference.

TECHNICAL FIELD

The present invention relates to plastic box structures, especially those that are useful for underground detention of stormwater.

BACKGROUND

There is a continuing engineering interest in economically detaining and dispersing stormwater, for instance, that which falls on a large vehicle parking area, such as may be associated with an office complex, shopping center, or the like. Generally, the aim is to avoid sudden flow of a large quantity of runoff rainwater onto adjacent lands or into such natural surface water courses as may be nearby.

One approach for handling stormwater is to flow the water into a detention pond, for slow discharge it over time to a surface water course, or to let the water percolate downwardly into subsoil. However, because the land needed for such a pond may often be expensive or unavailable, a familiar approach is to channel the stormwater into underground void spaces beneath the surface of a subject parking area. A familiar approach is to use rows of large plastic storm chambers having arch shaped cross section corrugated walls, where the chambers are buried within coarse stone. See Smith et al. U.S. Pat. No. 6,991,734 for an example of a detention system comprising storm chambers. Another approach involves use of parallel rows of large diameter corrugated plastic pipes.

Structures other than chambers and pipes have been used for stormwater handling, for example, rectangular plastic boxes or crates. Many prior art box-like structures comprise a plurality of vertical pillars that support horizontal plates. Examples of such types of systems are shown in patents such as U.S. Pat. No. 10,563,391 Diskskotter and U.S. Pat. No. 9,506,235 Adams et al., and European patent publication EP2495373A2. Boxes are typically arranged as a multiplicity of adjacent and stacked units in a stormwater system.

Compared to semi-round chamber structures, box/crate structures might seem to provide the advantage of greater void volume for water per unit area of footprint. But compared to the inherent simplicity and strength of corrugated arch shape chambers, rectanguloid box structures require numerous, sometimes complex, strengthening features in context that it is object to minimize weight.

Stormwater boxes, as is generally the case with arch shape cross section chambers, must resist not only the overlying load of the soil, pavement and vehicles, but they also must resist lateral loads of the typical surrounding crushed stone media or soil that is applied to the vertical sides of system. Furthermore, the components of a stormwater box system must be able to be economically manufactured, shipped/stored, and installed. Chambers nest nicely for shipment and storage. Often, pre-fabricated parts of systems comprising prior art stormwater boxes so nor nest nicely for economic shipment. And it is undesirable if a stormwater system requires a lot of labor for assembly at the point of use. Overall, the installed cost of any stormwater system must be of value compared to competitive alternatives for handling the same amount of water. There is a continuing need for improvements in design and manufacture of box type stormwater systems.

When boxes are put to other uses than stormwater detention, such as for providing temporary raised platforms for equipment, much of the same needs apply.

SUMMARY

An object of the invention is to provide a box structure that is strong that is economic to make and ship, and which can be assembled at or near a point of use, to provide a suitable for receiving stormwater when buried within soil or other media and which is economic to make and ship.

In accord with the invention, a rectanguloid shape thermoplastic box that is useful for receiving and dispersing stormwater when part of an array of like boxes that is buried in permeable media, has six walls and interior bracing in the form of a multiplicity of hollow pyramids, the apexes of which meet near the center of the box; preferably a complex irregular polyhedron structure that comprises six hollow pyramids. The truncated apexes of the pyramids meet near the center of the box. The base of each pyramid is contact with, attached to, or integral with a wall. A representative polyhedron bracing structure has a centerplane cross section which is shaped like a Maltese Cross.

In an embodiment of the invention, a box may be injection molded as a single piece molding wherein the walls are connected by living hinges and the pyramids are integral with the walls. Folding of the walls at the living hinges enables creation of the box at a job site after economical shipment to the site. Alternately, the pyramidal polyhedron bracing structure may be formed as a separate element and placed within the walls of a previously formed box.

In an embodiment of the invention, the box has the shape of a cube; each wall is thus square shaped. Each wall has a central square opening for passage of water. The base of each pyramid is integral with a wall around the periphery of the opening. And a grate is positioned within the wall opening to inhibit surrounding media from entering the concavity of a pyramid.

In an embodiment of the invention wherein each pyramid base is integral with, or attached to, a wall, and wherein the box is formed by folding a molded piece about living hinges, the walls are held together by a plurality of latches and catches in proximity to edges of the walls.

In an embodiment of the invention a first pyramid extends from a first wall and is attached at its flat-surfaced truncated apex to the flat-surfaced truncated apex of a second pyramid extending from an opposing second wall. Optionally, the flat-surfaced apexes are secured to each other by fasteners such a molded pins in one apex that are received in perforations in the mating apex. And the truncated apex of each of the four other pyramids is gable-shaped and in contact with the first pyramid and the second pyramid where the apexes of the pyramids meet near the center of the box.

In an embodiment of the invention, when assembled as an array of parallel adjacent rows in two or more layers, boxes may be covered with geotextile and buried in media. A plurality of adjacent boxes may be connected to each other, as by dog bone shape connectors that are received in recesses in the tops or sides or bottoms of the boxes.

The invention fulfills the objects of the invention in being strong, and in being capable of being economically shipped as a substantially flat living-hinged structure. The foregoing and other objects, features and advantages of the present invention will become more apparent from the following description of preferred embodiments and accompanying drawings.

DESCRIPTION

Figure 1:
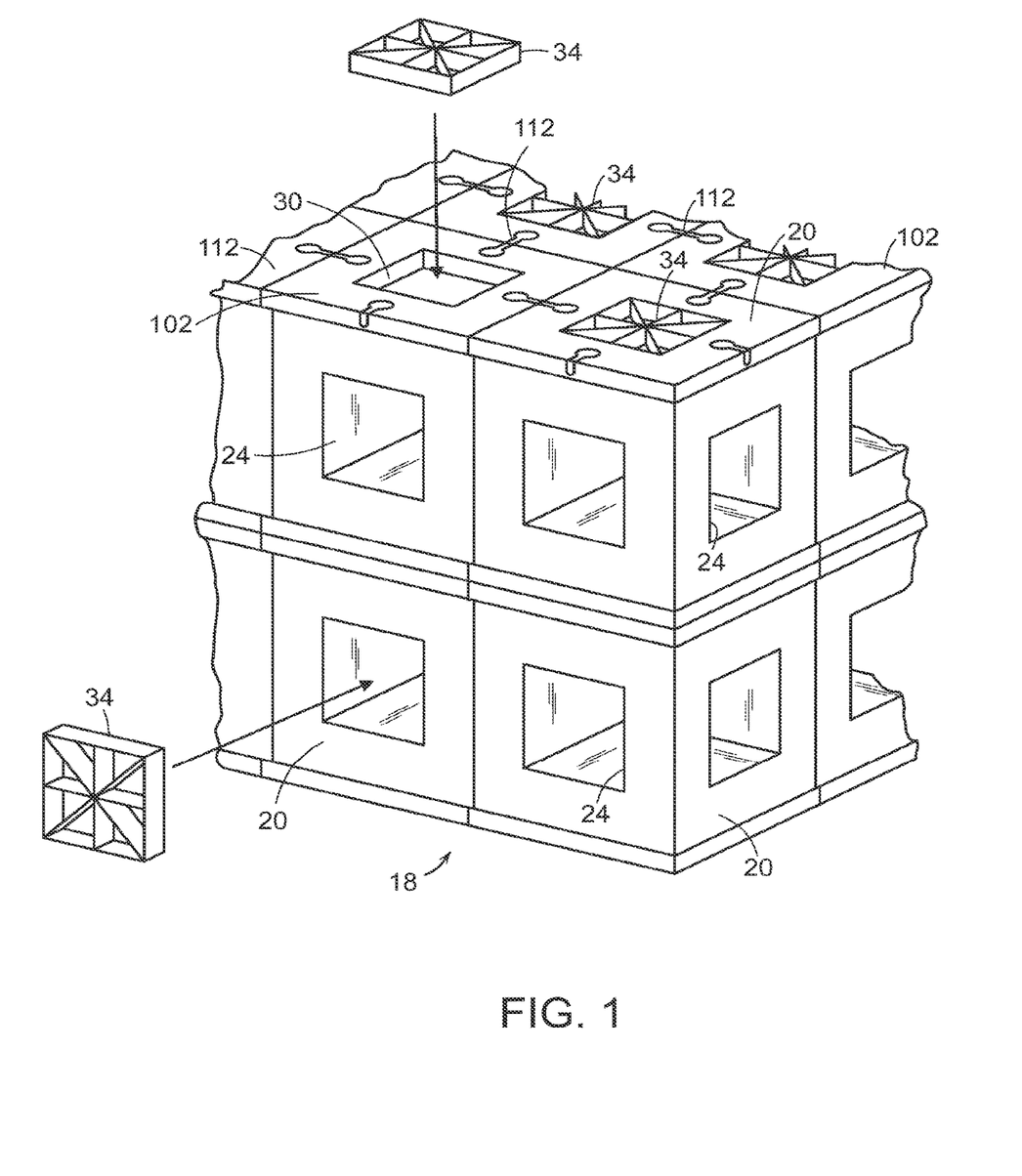
FIG. 1 shows a portion of an array of stormwater boxes.

FIG. 1 shows a portion of an exemplary system 18 that is an array of a multiplicity of boxes 20 of the present invention. The boxes are in rows where they abut each other. The boxes are stacked "two-high" and are arranged in adjacent regular abutting rows. An array may be one-high or more than two-high. An array may have different shapes looking down from above, for instance the shape may be rectangular or T-shape; or rows may be spaced apart, and so forth. Stacks may be of varying height. The boxes 20 pictured in FIG. 1 are simplified renderings; see the discussion below that relates to FIG. 2 and FIG. 3.

Laterally adjacent boxes may be secured to each other, exemplarily by connectors 112 that are described below. Typically, an array may have the shape of a rectanguloid, as FIG. 1 suggests. Typically, an array that is readied for use is assembled within an excavation in the earth. After assembly, the excavation is backfilled, optionally with crushed stone, other permeable media, or native soil. Typically means, as discussed below, are employed to inhibit the back-fill media from entering the interior spaces of the array.

Boxes of the present invention are preferably made of injection molded polyolefin plastic such as polypropylene or polyethylene, which is considered here to be a semi-rigid elastically deformable structural material. Other plastics and compositions of matter may be used. In a preferred mode, the plastic boxes will be designed in accord with good design of familiar mass-production injection molded components. Such design features include providing structural portions with appropriate cross sections, having appropriate joint locations and configurations, having integral bracing, ribbing, perforations, and lattice work, etc. for strength, lightness, and economic use of material, and rapid production; having rounded edges, fillets and the like.

Each box 20, an embodiment of the present invention, comprises a unique type of internal bracing, namely bracing that includes a complex irregular polyhedron structure comprising six intersecting truncated pyramid-like elements.

Figure 2:
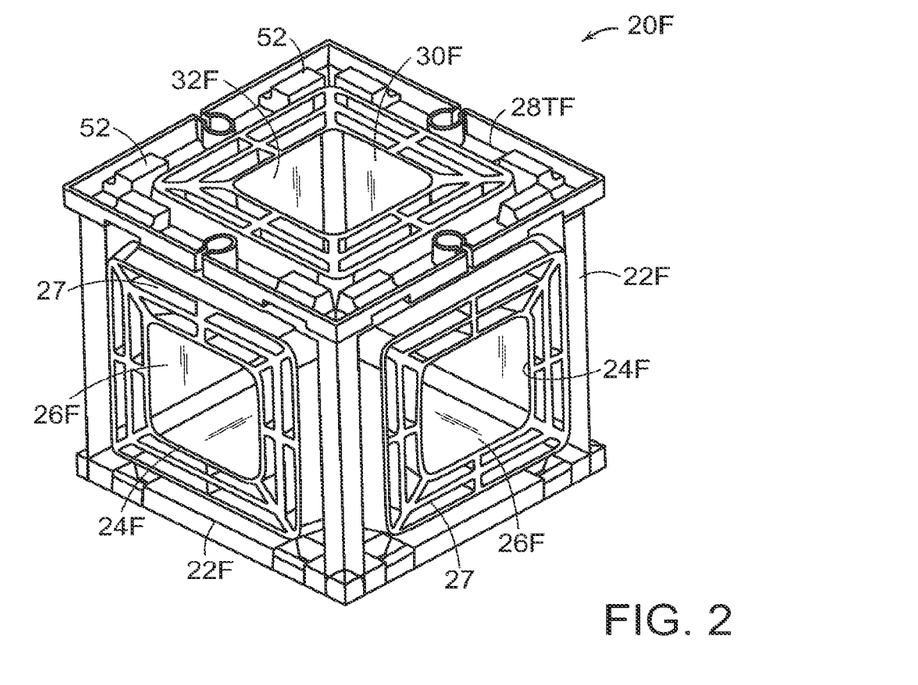
FIG. 2 is a perspective view of an essential stormwater box embodiment showing details of the molded walls.
Figure 3:
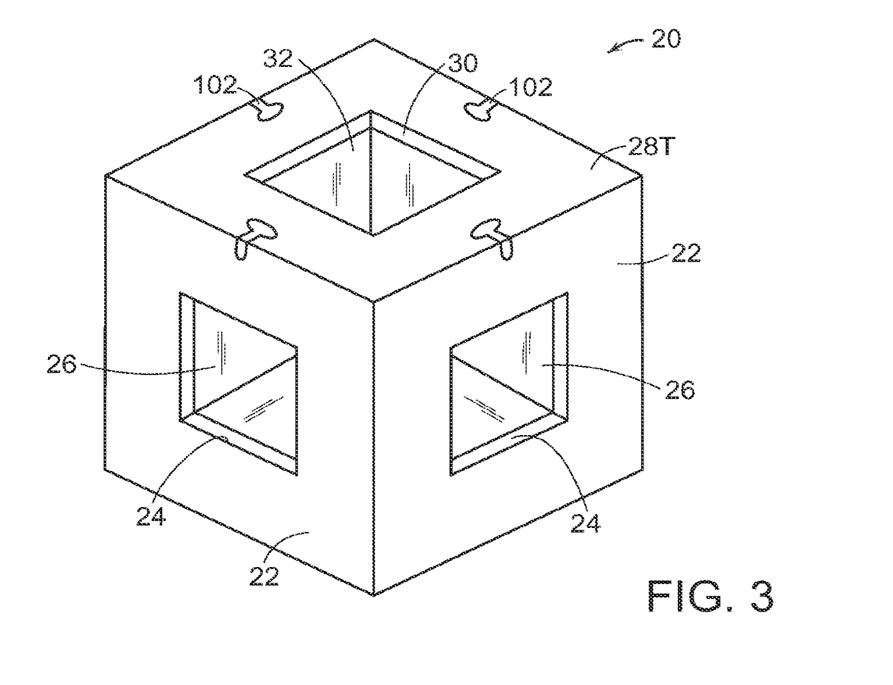
FIG. 3 shows the box of FIG. 2 in simplified fashion.

FIG. 2 is a drawing of box 20F, which is a rendering of a box which has ribbing and recesses that are typical of an industrial plastic molding, where an object is to achieve the needed structural strength while minimizing the quantity of material and speeding a preferred process of injection molding. FIG. 3 is a rendering of box 20 that is a "plain" version of box 20F. FIG. 3 is representative of style of the other figures except for FIG. 2. In FIG. 3 much plastic-molding detail is omitted in FIG. 3, but should be considered as being present. The purpose of the "plain rendering" of boxes herein is to eliminate visual clutter in the drawings, thereby enabling clearer and simpler illustration of features of invention embodiments. For similar reason, a number of snaps and latches that hold the walls to each other are omitted in the drawings. Such omitted detail is of the kind that persons of ordinary skill will comprehend as being present in embodiments of the invention.

Figure 9:
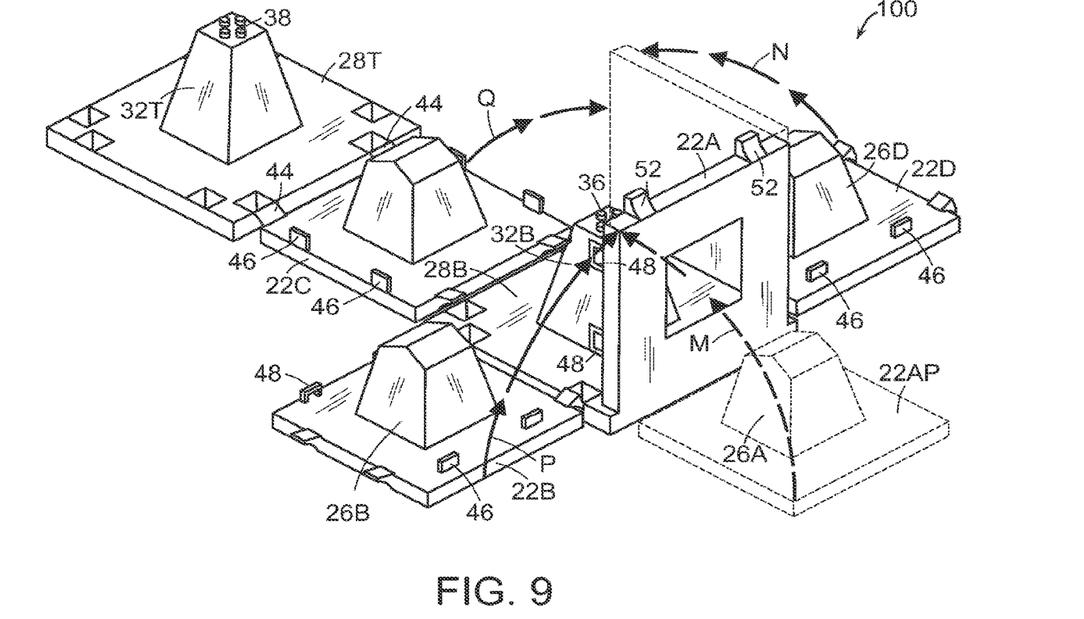
FIG. 9 shows a precursor molding comprising the six living hinged walls of a stormwater box.

Box 20 may be formed by injection molding a multiplicity of separate pieces, for example six wall pieces, six pyramids, etc. Such pieces will then be assembled and secured to each other to form a desired box 20. Parts may be secured to each other by fastening, snap-locking, welding, adhering, etc. For rapidity of assembly, each box 20 is formed by making a single injection molded plastic piece comprising six plastic walls (which will be the six sides of a box to-be-formed); the walls are hingedly connected to form an article as shown in FIG. 9, discussed below. The molded piece is folded at the hinge points into the shape of a rectanguloid (e.g., a cube), usually near the point of use. As described below, the walls snap lock to each other. The aforementioned molded piece is referred to hereafter as the "precursor molding," or simply the "precursor." An exemplary precursor 100 is shown in FIG. 9. (FIG. 9 shows wall 22A after it has been folded upwardly from the original as-molded "flat position", indicated by the phantom 22AP.)

Figure 14:
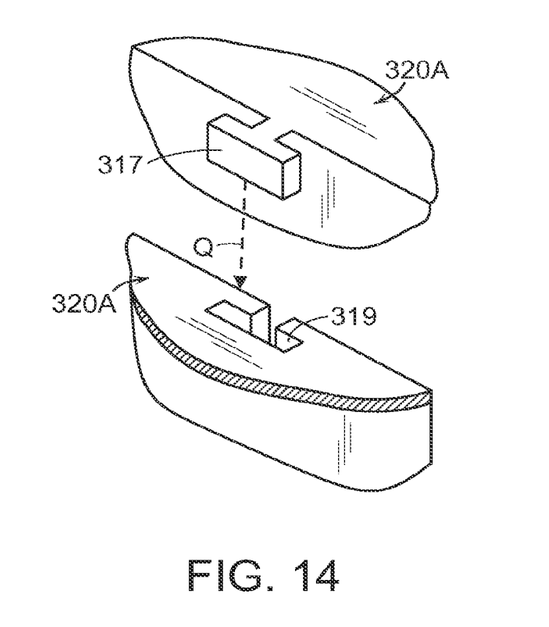
FIG. 14 is a fragmentary exploded perspective view of the tops of two boxes, one displaced upwardly from the other, showing how an integral male fitting on one box mates with a female cavity of the other box, to connect the boxes.

In a precursor molding, each wall has an exterior surface that nominally lies in the same plane as the like exterior surfaces of the other walls. "Nominally" in the preceding sentence is appropriate because as shown in FIG. 2 the exterior surface of a molded wall 22F is uneven, having a number of recessed portions that are closely-spaced apart from a plane which contacts the "high points" of a wall. Reference may be made to FIG. 2 and the associated description. A typical wall will lie flat if its exterior surface is placed onto a planar surface, provided allowance is made locally for a disrupting mechanical connector 317 as shown in FIG. 14.

In the description which follows, a box with its internal bracing and other features, ready-for-installation in a stormwater drain field or other use, is described first. Then the precursor molding is described, along with how that article is converted to a box, usually at or near the point of use.

Referring both simultaneously and respectively to box 20F of FIG. 2 and box 20 of FIG. 3, each box comprises six square walls which form four side walls 22F, 22, a top wall 28F, 28 and an opposing bottom wall 28B. 28 (hidden from view in these figures). Each side wall 22F, 22 has a centralized rectangular opening 24F, 24. In addition, there are openings in the wall. From the inner periphery of each rectangular opening, a hollow truncated pyramid 26F, 26 (described in more detail below) extends toward the center of the box. The top and the bottom walls 28TF. 28T each have a centralized rectangular opening 30F. 30, from the periphery of which a hollow truncated pyramid 32F, 32 extends toward the center of the box. The side edges of each pyramid of box 20F are "broken", i.e., they are heavily chamfered. A pyramid with such kind of edges is still classified according to its essential transverse cross section; e.g., pyramids 26F. 26 are square cross section pyramids. The truncated pyramids 26 are described further below; for simplicity they are referred to hereafter as "pyramids." As described below, an assembly of multiple pyramids constitutes a polyhedron structure that provides good strength. The openings 24, 24F allow water to flow to and from the hollow pyramidal interior during use. Additional passageways 27 in portions or each wall that are adjacent to the central opening allow water to flow to and from the hollow interior of the box into which the pyramids project. Walls may be differently constructed insofar as water passageways are concerned, for instance, they may comprise portions that are lattice-like.

An exemplary box 20, 20F presents as a cube having edges that are about 60 cm long. In alternative embodiments of the invention, mentioned further below, a box may comprise in part of whole walls which have a non-square rectangular shape.

While box 20 and other embodiments of the invention may be described in terms of having side walls and top and bottom walls, such a characterization is for convenience of describing here boxes, and such shall not be limiting with respect to how a box is oriented for use or other purpose. During use, a box may be oriented so any wall faces upwardly.

Referring again to FIG. 1, to inhibit crushed stone and other surrounding granular media from infiltrating into the interiors of the boxes, each opening 30 which faces upwardly is fitted with a grate 34 which comprises a plurality of ribs. An exemplary grate comprises a frame, with ribs arranged in superimposed patterns of + and X. Similarly, each side-facing opening 24 of a box may be fitted with a grate 34, particularly for walls of boxes that comprise an outward facing surface of the box array. Typically, the whole top and the sides of the array is covered with geotextile when the surrounding media is fine enough to pass through the grate openings.

Figure 7:
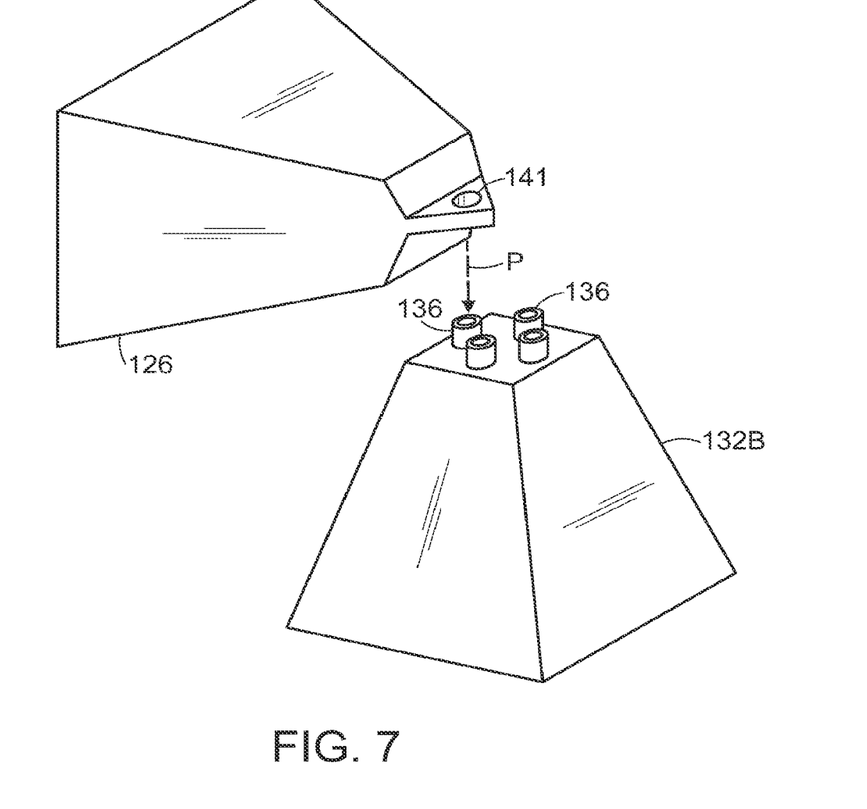
FIG. 7 is an exploded view of a portion of an embodiment of polyhedron bracing structure wherein a representative side pyramid has an apex comprising a tab that engages a pin at the apex of the bottom pyramid.

The hollow pyramid that is integral with each wall exemplary box 20, as illustrated by FIG. 7, when injection molded, precludes having an integral grate in a wall opening. Thus, a grate will be separately formed and secured in place by snap-fittings, tabs, fasteners, welding, or other well-known means. Use may be made of grates having other rib patterns or opening configurations that are different from a grate 34. When, as described below, the interior bracing is a separate element that is placed into a box after five walls have been assembled, grates may be integral with each wall. When a pyramid is attached to or integral with a wall, the openings of the grate allow water to flow to and from the concavity of the pyramid. In some embodiments there may be no need for a grate in the opening where the pyramid base is, for example where the media is very coarse or its entry into the pyramid concavity is acceptable. In other embodiments of the invention, a pyramid may have walls with that a perforated for water flow. And there may be passageways through the walls of a box in addition to such passageway(s) as is provided the opening associated with a pyramid base and any grate.

Figure 4:
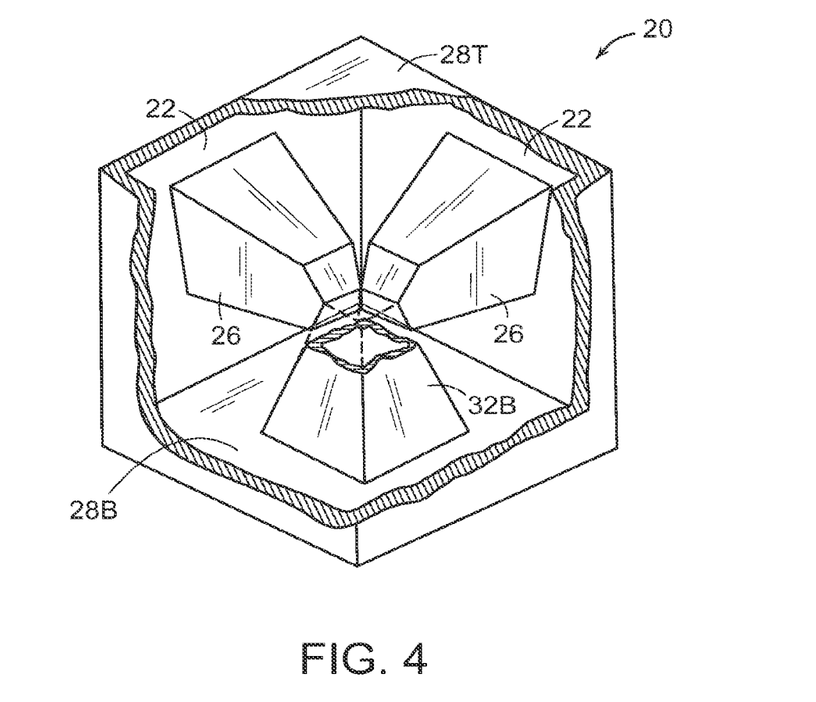
FIG. 4 is a partial cutaway perspective view of a stormwater box of FIG. 3, showing portions of the interior polyhedron structure that braces the walls.

FIG. 4, a partial cutaway of box 20, that along with other figures shows how pyramids 26, 32 are arranged within the box. Each pyramid has four walls. The wall of an exemplary pyramid has a thickness of about 3 mm. Each pyramid 32 has four truncated-triangle sides and a flat top apex 39T, 39B. Each pyramid 26 has four truncated sides and a double-sloping top that presents as a gable 13.

The truncated apexes of the six pyramids meet in proximity to the center of the box. The arrangement of pyramids provides good strength to the box. As described further below, the pyramid 32T that is integral with top wall 28T has an apex finish that is somewhat different from the apex finish of pyramid 32B of bottom wall 28B. A reference herein to "walls 28" of a box is a reference to both walls 28T and 28F; a reference to "walls 22" is a reference all four side walls of a box; and a reference to "pyramids 26" is a reference to all four side pyramids; and a reference to "pyramids 32" is a reference to both the top and bottom pyramids.

Figure 5:
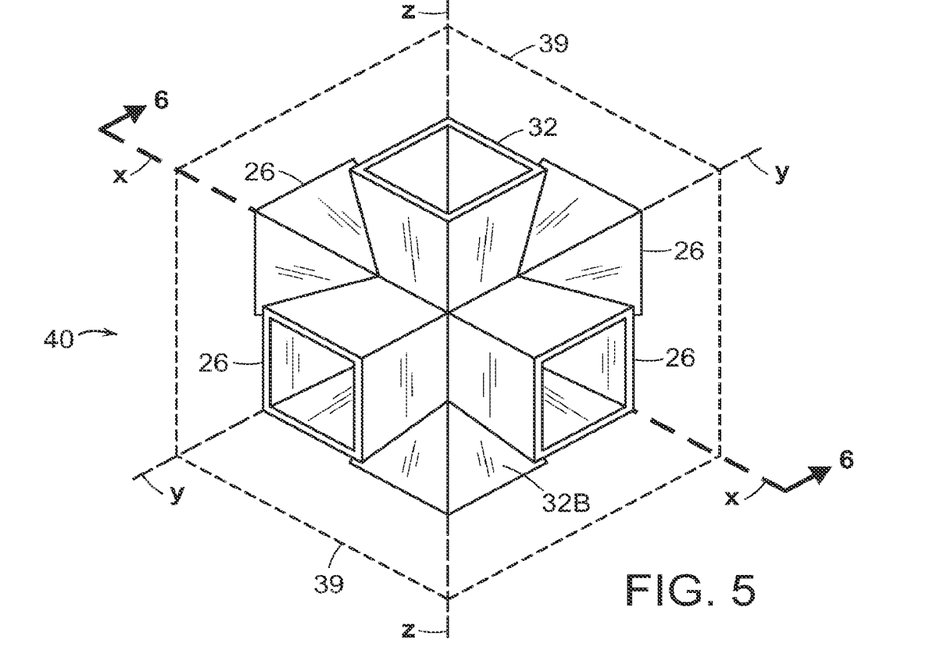
FIG. 5 is a perspective view of the polyhedron bracing structure of the box of FIG. 3 along with the box in phantom.

In an alternative embodiment of the invention, a pyramidal polyhedron bracing structure like that structure 40 pictured in FIG. 5 may be separately molded as a unitary element and inserted into a previously formed box that has one side open; the one side is then closed by securing a last wall. The bracing structure may be optionally fastened to one or more of the walls.

Within a box 20, the flat top apex of each pyramid 32 contacts the other. The apexes are preferably secured to each other by integral fasteners, as described below in connection with FIG. 6. Within box 20, the double sloped gable top 37 of each side pyramid 26 fits into one of the four valleys formed by the portion of each pyramid 32 that is in proximity to its apex.

FIG. 5 shows a six-pyramid assembly, polyhedron 40. The integral walls of the box are omitted for purpose of illustration. The outline of the box within which the polyhedron fits is suggested by the dashed lines 39. The six-pyramid assembly is a complex irregular polyhedron. Polyhedron 40 provides very good support to each wall and overall rigidity to the box. As described below, at the central region of the box the apexes of the pyramids press against each other. In the embodiment presently being described the top and bottom pyramids are secured to each other and thus can bear a certain tensile load where they touch each other. The other pyramid apexes are in contact but not attached, and thus they will only bear compressive loads. While the pyramid elements of the polyhedron in this embodiment are not attached to each other, they bear the loads mentioned, and by virtue of the configuration of the joints they form in the center of the box, they provide resistance to box lateral and vertical loads and impart resistance to box deformation. Thus, as a whole, the multi-piece polyhedron 40 is characterized as a structural element of the box.

Figure 6:
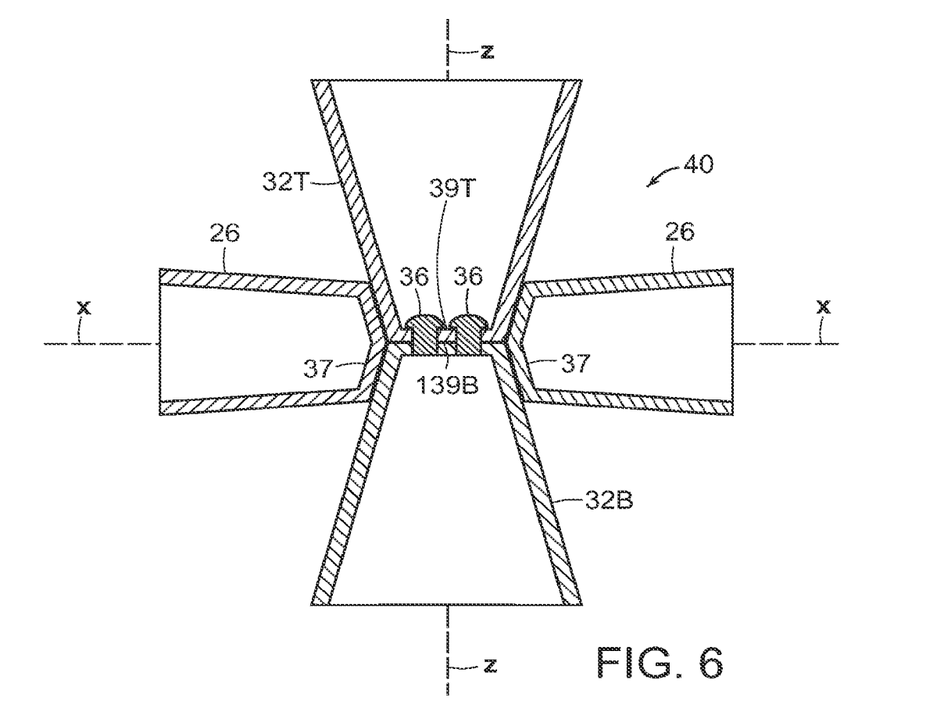
FIG. 6 is a centerplane cross section of the polyhedron of FIG. 5.

FIG. 6 shows an x-z plane cross section of polyhedron 40. In FIGS. 5 and 6, the lower pyramid is designated 32B, the upper is designated 32T. In the polyhedron bracing 40, the apexes of pyramids 32 are not secured to the tops of 26.

FIG. 6 illustrates how, in the preferred embodiment, the apexes of the pyramids 32 are attached to each other by bulbous head plastic pins 36 (also called "stab connectors") that project upwardly from lower pyramid 32B. The pins have been pushed through holes 38 in the pyramid 32T. The pins thus lock the flat tops of pyramids 32 to each other. FIG. 7 and FIG. 9 may be referenced for other views of the pyramid top detail.

FIG. 7 shows two of the six pyramids that comprise an alternative embodiment of polyhedron brace, namely typical side pyramid 126 and bottom pyramid 132B. The apex of pyramid 126 has a tab 141 with a through hole that slips onto one of the pins 136 which project upwardly from bottom pyramid 132B, as indicated by the arrow P. The tab connects pyramid 126 to the mated top and bottom pyramids, thus providing resistance to motion of the pyramids 132 to lateral motion toward and away from the pyramid 126. The other three side pyramids may be similarly configured. Other means within the ordinary skill can be used to attach the side pyramid apexes to the vertical pyramids. In other embodiments, the apexes of pyramids may be attached by use of adhesives or other kinds of fasteners or snap latches. While a polyhedron comprised of separate pyramid elements preferably has at least some of the pyramids fastened to each other, in the generality of the invention, pyramids need not be attached to each other.

Figure 8:
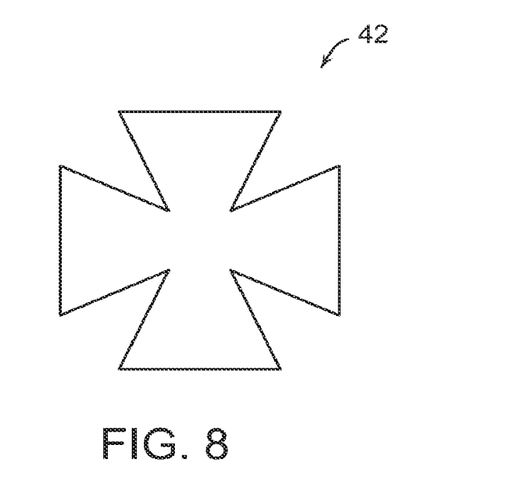
FIG. 8 shows the shape of a Maltese Cross.

Polyhedron 40 has an overall length dimension that is the same in each the x, y and z axis directions. Polyhedron 40 may be characterized with respect to its shape in one or all of the x-y, y-z or z-x planes. FIG. 8 shows a two dimensional object 42 that is called here a "Maltese Cross." The shape of the x-z plane cross section of the polyhedron 40 in FIG. 6 approximates the shape of the FIG. 8 Maltese Cross 42. (The FIG. 8 shape is more accurately called "Dudeney's Maltese Cross." as it is a variant of a cross pattée, which is a variant of a true Maltese cross that has forked extremities at the ends of the cross limbs. See https://mathworld.wolfram.com/MalteseCross.html.)

As noted, the centerplane cross sections of polyhedron 40 are substantially the same in each the x-y plane, the y-z plane, and the x-z plane. Thus, a box 20 of the present invention comprises an internal polyhedron that, in each of three orthogonal planes, has a cross section shape that approximates the shape of a Maltese Cross 42, as shown in FIG. 8.

When a box of the present invention is a rectanguloid but not a cube, the box may have four walls that are rectangular and two that are square. The polyhedron of such a box will present as an equal-armed Maltese Cross shape in one centerplane cross section, and as a distorted Maltese Cross shape in the other two centerplanes. The degree of distortion will depend on the size of the difference in length between the short sides and the long sides of a rectangular wall. When the box is a rectanguloid with six rectangular walls, all the centerplane cross sections will be distorted. A polyhedron structure within a box embodiment that has some or all rectangular walls will have a centerplane cross section shape that approximates a Maltese Cross, albeit distorted.

Figure 15:
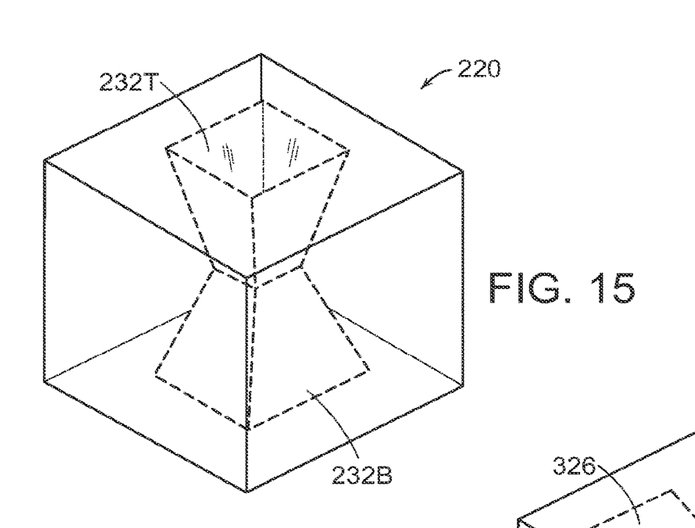
FIG. 15 is a semi-schematic representation of a box comprising two pyramids.
Figure 16:
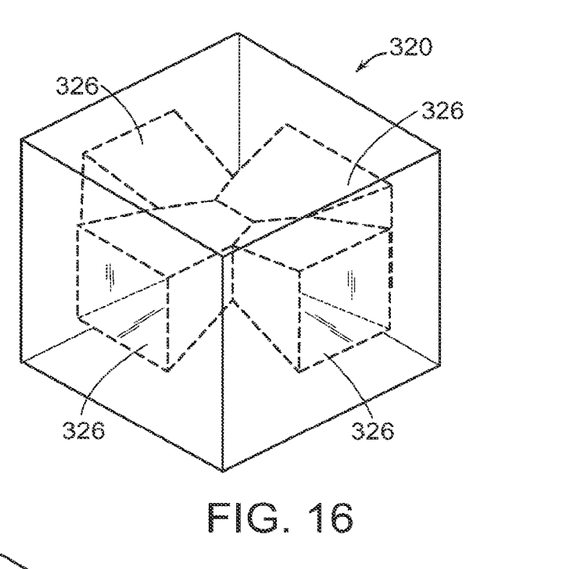
FIG. 16 is a semi-schematic representation of a box comprising four pyramids, all having lengths lying in the same horizontal plane.
Figure 17:
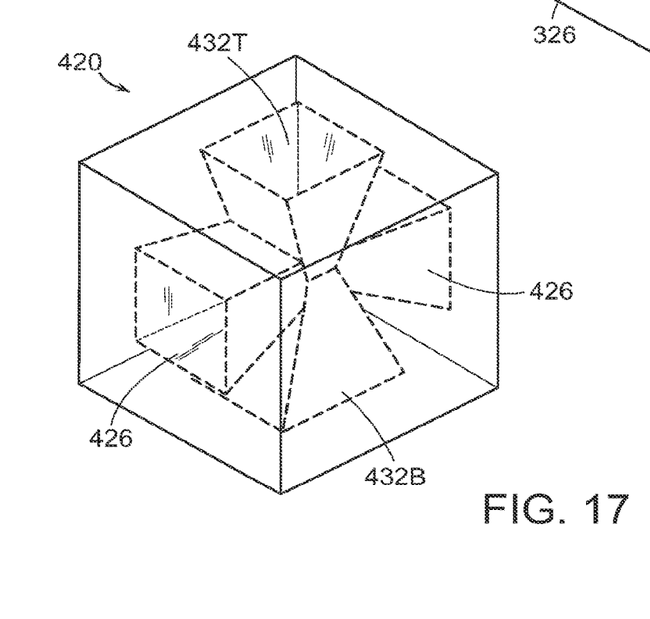
FIG. 17 is a semi-schematic representation of a box comprising four pyramids, all having lengths lying in the same vertical plane.

While the interior bracing which comprises six pyramids is preferred, in other embodiments of the invention an even number of pyramids that is less than six pyramids may comprise the interior bracing. If there are two or four pyramids, they are arranged as pairs, both members of which lie along the same central axis of the box. The truncated apexes of each said pyramid pair are in contact with, attached to, or integral with each other when there are only two pyramids. When there are two pairs of pyramids, the truncated apexes of each pyramid is in contact with, attached to, or integral with a portion of another pyramid which portion is at or near the apex of the other pyramid. Exemplifying the foregoing: FIG. 15 to 17 show in semi-schematic fashion boxes having fewer hollow pyramids. The boxes of FIG. 15 to 17 may be oriented during use differently than pictured. The apexes of the pyramids may be attached to each other or integral with each other. The pyramids are integral at their bases with peripheries of openings in the walls from which they extend inwardly, or they may comprise a separate bracing structure that has the base of each pyramid in contact with or fastened to a wall. FIG. 15 shows box 220 with two opposing pyramids 232T, 232B that meet at their apexes, where they may be attached to each other as shown in FIG. 6 or in other ways mentioned herein. FIG. 16 shows box 320 which comprises four pyramids 326. FIG. 17 shows pyramids 432T and 432B along with opposing side pyramids 426, all of which meet in proximity to the center of the box.

Figure 10:
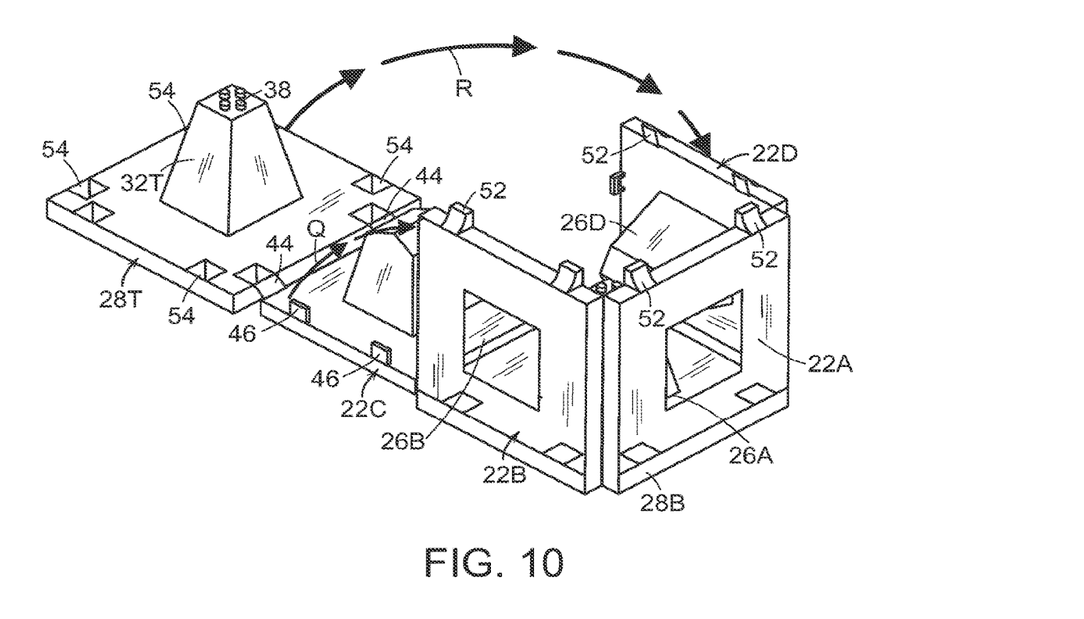
FIG. 10 shows the precursor molding of FIG. 7 when it is partially folded to form a cubical stormwater box.

In embodiments of the invention, thermoplastic is injected into the mold of a machine to produce a precursor molding, for example, precursor 100 that is shown in FIG. 10. To facilitate description of how the molding 100 is converted into a box 20, the portions of the precursor molding which will form the side walls of the box are numbered 22A, 22B, 22C, and 22D. The pyramid that is integral with each of the foregoing wall portions is respectively differentiated by a corresponding letter suffix; thus, there are pyramids 26A, 26B, 26C, 26D. Likewise, the portions of the molding 100 which are configured to provide the top wall and bottom wall are respectively labeled 28T and 28B; and the respective associated pyramids are 32T and 32B. Each wall is connected to one or more of the other walls by a pair of living hinges. For example, hinges 44 connect wall 28T with wall 22C; and wall 28B is hinge-connected to three other walls, namely, walls 22A, 22B and 22D.

In FIG. 9, the as-molded position of wall 22A in precursor 100 is shown as phantom wall 22AP (having pyramid 26A). Thus, precursor 100 as molded has a "planar configuration" wherein every wall exterior surface nominally lies in the same plane and all pyramids extend perpendicularly to the plane. The planar configuration of precursor 100 makes shipment economical since the precursors can be nested, one within another, for economic storage and shipment as a stack. FIG. 9 shows wall 22A after it has been moved, as indicated by arrow M, from the phantom position to a vertical position, where it is momentarily held manually or by a fixture, not shown. The next step, moving wall 22D to a vertical position, is indicated by arrow N. That causes elastically resilient snap latches 46 of wall 22D to engage catches that are hidden from view on the right edge of wall 22A in the Figure. The catches are tabs like tabs 48 on the opposing left edge of wall 22A. Each catch/tab 48 has an opening shaped to receive and engage a latch 46. The tab-catch engagement holds the walls 22A, 2D together so they remain vertical. The next step is to fold wall 22B vertically as indicated by arrow P, and it is held in position the same way as wall 22D.

FIG. 10 shows precursor 100 with walls 22B and 22D latched to wall 22A; the three walls are perpendicular to bottom wall 28B, which is hidden but for the wall edge. Arrow Q shows the next step wherein wall 22C is moved to a vertical new-home position. Each wall is held in place by engagement of catches and latches as described above. Finally, as indicated by arrow R, top wall 28T is flipped and pressed downwardly onto the top edges of the three sidewalls 22A, 22B, 22C. Resilient latches 52 that extend upwardly from the three upper edges of walls are received in catches (openings) 54 of top wall 28T. And during that final assembly motion, the pins 36 of pyramid 32B are received in holes 38 of pyramid 32T, latching the two pyramids to each other.

Figure 11:
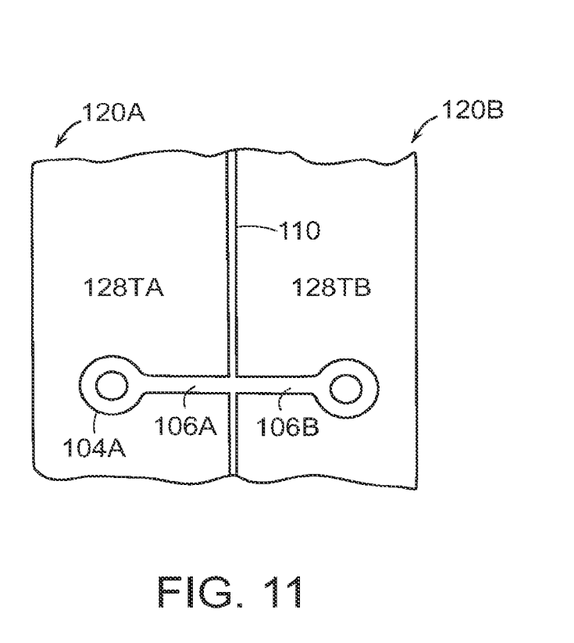
FIG. 11 is a fragmentary top view two mated stormwater boxes, the top of each box having a recess and channel that is shaped to receive half of a first kind of dog bone style connector.
Figure 12:
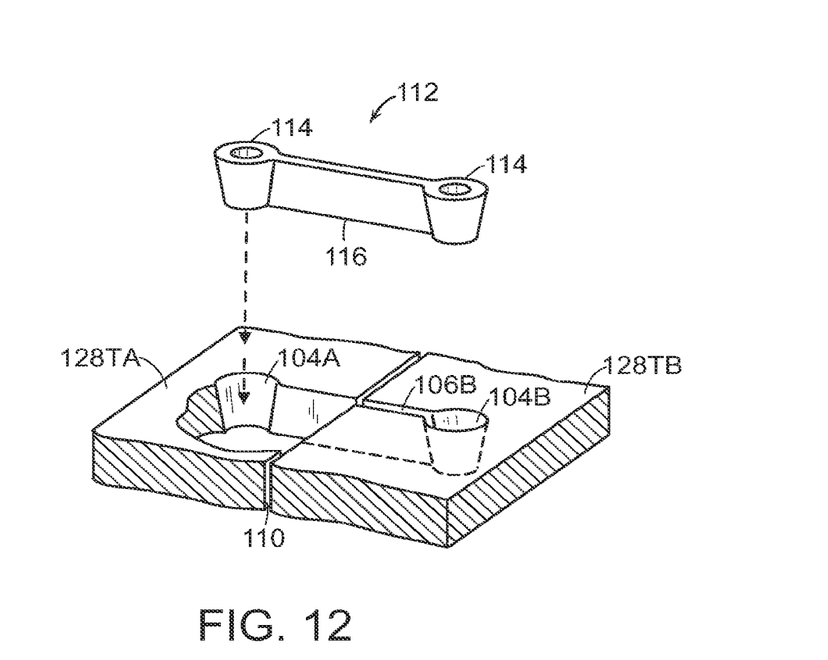
FIG. 12 is a fragmentary exploded perspective view of the abutting tops of two stormwater boxes like those of FIG. 11 along with a first kind of dog bone style connector.

Referring again to FIG. 1, when boxes are stacked as an array, a box may be secured to one or more adjacent box by use of exemplary mechanical connectors 112, to hinder inadvertent movement during the installation process, and to add some strength to the array. The fragmentary top view of FIG. 11 and the perspective exploded view of FIG. 12 show the region around a joint 110 between two boxes 120A, 120B having respective top walls 128TA, 128TB, respective vertical channels 106A, 106B. Each vertical channel terminates at a respective conical shape socket 104A, 106B.

Mechanical connector 112, which might be referred to generically as a "dog bone connector," comprises opposing end conical plugs 114 (each with a lightening center hole), and a rectangular cross section bar 116 that runs between the plugs. Each plug 114 of mechanical connector 112 fits into one of the top wall sockets and the bar 116 fits into the aligned channels 106A, 106B. As shown in FIG. 2, the top of each exemplary box has a multiplicity of recesses 102. The bottom wall of each box may also have recesses 102 to enable use of mechanical connectors at the bottom. Fewer or more mechanical connectors than are illustrated may be used.

Figure 13:
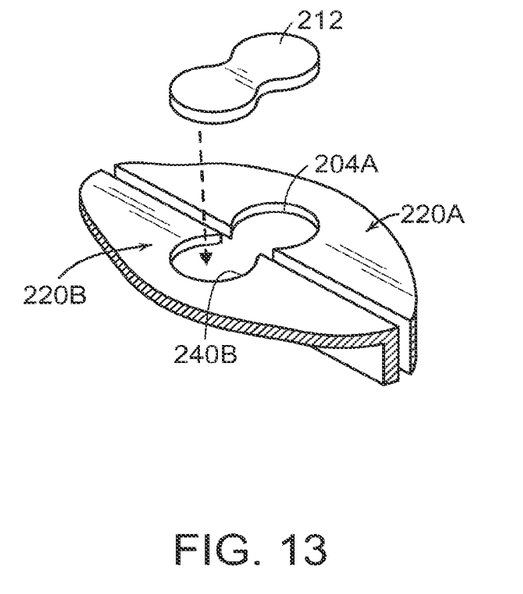
FIG. 13 is a fragmentary exploded perspective view of the tops of two abutting boxes showing how a second kind of dog bone connector fits into mating recesses of the box tops.

FIG. 13 shows mechanical connector 212, which also is in style a dog bone (rounded ends connected by a narrower width bar). Each bulbous end of the connector sets within one of the mated part-circle recesses 204A, 204B. FIG. 14 shows another way of connecting boxes which may be alternatively used in embodiments of the present invention. A male T shape fitting 317 extends laterally from box 320A and is received in T shape slot 319 of box 320B when, during installation, box 320A is lowered into position adjacent to box 320B.

In an alternative embodiment way of forming a box of the present invention, a free-standing polyhedron like polyhedron 40 may be formed with all apexes of the pyramids secured to each other by integral molding or by mechanical fasteners. Such a free standing polyhedron might be placed within a five sided (open top) box that is made other means than forming the hinged-connected wall precursor molding described above. The walls of the box may have a shape like the walls shown in FIG. 2, with integral grates, or the walls may have another configuration that provides strength and passage of water, including walls taught in the prior art. The free-standing polyhedron then may positioned within the box and a cover wall secured to the top of the box. The polyhedron may be engaged mechanically with some or all of the walls, or otherwise attached to said walls.

While the pyramids described herein have been regular pyramids, each having a square or rectangular base that is secured to, attached to, or integral with, a wall of the box; with planar sides, within the scope of the invention are pyramids having other regular polygon transverse cross sections, as well as pyramids which have irregular polygon shape bases, round bases or oblong bases. And the sides of a pyramid may be non-planar. For example, the sides may be curving or stepped.

A box of the present invention may be used singly for particular purposes. Boxes of the present invention may be used to form components of a septic system leach field; and for purposes other than receiving liquids when buried in soil.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A box, made of thermoplastic and useful for receiving and dispersing liquid when buried in permeable media, the box having a rectanguloid shape, comprising:
    six walls, attached to each other thereby forming said rectanguloid shape, each wall having an interior surface, an exterior surface, and one or more passageways through the wall; wherein one or more of the walls further comprises a plurality of T-shaped cavities in the exterior surface of the one or more walls, the plurality of cavities being configured to receive a portion of a T-shaped connector; and
    a bracing structure having an irregular polyhedron shape, the bracing structure comprising first, second, third, fourth, fifth, and sixth hollow pyramids, each pyramid having a base, a length, and a truncated apex; the base of each pyramid being in contact with, attached to, or integral with, a wall of the six walls; wherein a portion of each pyramid is in mating contact with, attached to, or integral with, a portion of one or more other pyramids.

2. The box of claim 1, wherein each wall is square shaped, having a passageway in the form of a square opening in a center of the wall.

3. The box of claim 2, wherein each pyramid has four sides and wherein the base of each pyramid is integral with a wall at a periphery of said square opening.

4. The box of claim 3, further comprising a grate positioned within each of the square wall openings.

5. The box of claim 1, wherein each wall is connected by living hinges to at least one other wall.

6. The box of claim 5, further comprising a plurality of latches in proximity to an edge of each wall of the six walls, the plurality of latches being configured to attach the walls to each other.

7. The box of claim 1, wherein each wall has a central opening and the base of each pyramid is integral with the wall at a periphery of the central opening.

8. The box of claim 1, wherein the T-shaped connector extends laterally from the exterior surface.

9. The box of claim 1, wherein, in use, the T-shaped cavities are configured to receive a connector in a direction parallel to the exterior surface.

10. The box of claim 1, wherein each of the first pyramid and the second pyramid has a flat-surfaced truncated apex, the flat-surfaced truncated apex of the first pyramid being pinned to the flat-surfaced truncated apex of the second pyramid.

11. The box of claim 1, wherein the first pyramid of the multiplicity of hollow pyramids extends from a first wall.

12. The box of claim 1, wherein the bracing structure is a monolithic structure.

13. The box of claim 1, in the form of a precursor molding, wherein the exterior surface of all walls lies nominally in a common plane and wherein the multiplicity of pyramids extend transverse to the common plane.

14. The box of claim 1, wherein one or more walls further comprises a plurality of cavities in the exterior surface of the one or more walls, the plurality of cavities being configured to receive a portion of a mechanical connector.

15. An array of a multiplicity of boxes of claim 1, arranged as parallel laterally adjacent rows of abutting boxes, two or more layers deep.

16. The array of claim 15, wherein each box of the plurality of abutting or laterally adjacent boxes is secured to an adjacent box or abutting box by one or more T-shaped connectors.

17. The array of claim 15, wherein the array is buried within and covered by permeable media.

18. A box for receiving and dispersing liquid when buried in permeable media, the box having a rectanguloid shape, comprising:

six walls, attached to each other to form said rectanguloid shape, each wall having an interior surface, an exterior surface, and one or more passageways through the wall; wherein one or more of the walls further comprises a plurality of T-shaped cavities in the exterior surface of the one or more walls, the plurality of cavities being configured to receive a portion of a T-shaped connector, and a bracing structure comprising an even-number of hollow pyramids, each pyramid having a base, a length, and a truncated apex; wherein the base of each pyramid is integral with a wall at the periphery of an opening therein; the pyramids being arranged as pairs that lie along the same axis; wherein a first pyramid of a first pair of pyramids extends from a first wall and a second pyramid of the first pair of pyramids extends from a second wall, the truncated apex of the first pyramid contacting the truncated apex of the second pyramid; and wherein the box further comprises one or more additional pair of pyramids having a first pyramid and a second pyramid configured to contact the first and second pyramids of the first pair of pyramids.

19. The box of claim 18, wherein the T-shaped connector extends laterally from the exterior surface.

20. The box of claim 18, wherein the truncated apex of each pyramid of a pair is in mating contact with, attached to, or integral with a portion of another pyramid.

* * * * *